United States Patent
Schmidt et al.

(10) Patent No.: US 11,892,058 B2
(45) Date of Patent: Feb. 6, 2024

(54) COAXIAL GEAR MECHANISM

(71) Applicant: WITTENSTEIN SE, Igersheim (DE)

(72) Inventors: Michael Schmidt, Reichenberg (DE); Martin Kimmelmann, Weikersheim (DE); Andreas Kümmeth, Obernbreit (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 17/950,690

(22) Filed: Sep. 22, 2022

(65) Prior Publication Data

US 2023/0095996 A1    Mar. 30, 2023

(30) Foreign Application Priority Data

Sep. 24, 2021  (DE) .......................... 102021124755.1

(51) Int. Cl.
*F16H 1/24*      (2006.01)
*F16H 55/12*     (2006.01)

(52) U.S. Cl.
CPC .............. *F16H 1/24* (2013.01); *F16H 55/12* (2013.01)

(58) Field of Classification Search
CPC . F16H 1/24; F16H 55/12; F16H 25/06; F16H 2057/0335; F16H 57/033; F16H 55/0846; F16H 49/00; F16H 49/001
USPC ........................................ 74/414, 838, 839
See application file for complete search history.

(56) References Cited

U.S. PATENT DOCUMENTS

| | | |
|---|---|---|
| 2021/0131545 A1 | 5/2021 | Schmidt et al. |
| 2022/0107002 A1 | 4/2022 | Schmidt et al. |
| 2022/0178430 A1 | 6/2022 | Kimmelmann et al. |

FOREIGN PATENT DOCUMENTS

| | | | |
|---|---|---|---|
| CN | 110645334 A | * | 1/2020 |
| CN | 110645334 A | | 1/2020 |
| DE | 102019129660 A1 | | 5/2021 |
| DE | 102019129662 A1 | | 5/2021 |
| DE | 102020126107 A1 | | 4/2022 |
| DE | 102020132794 A1 | | 6/2022 |

OTHER PUBLICATIONS

European Search Report dated Feb. 6, 2023 for corresponding application 22196575.

* cited by examiner

*Primary Examiner* — Jake Cook
(74) *Attorney, Agent, or Firm* — Bachman & LaPointe, P.C.

(57) ABSTRACT

A coaxial gear mechanism (1) includes a toothing (5) which is oriented axially with respect to an axis of rotation (3) of the coaxial gear mechanism (1), a tooth carrier (7) which in each case has axially oriented guides (9), and tooth pins (11) which each comprise a body (50), which is mounted so as to be axially displaceable in a guide (9) of the tooth carrier (7), and a head region (51), wherein the head region (51) includes at least one tooth (52) for engagement with the toothing (5), and wherein the tooth carrier (7) wherein the tooth carrier has an irregular angular pitch.

11 Claims, 5 Drawing Sheets

COAXIAL GEAR MECHANISM

BACKGROUND OF THE INVENTION

The invention relates to a coaxial gear mechanism, in particular a coaxial gear mechanism which is produced from a kit for a range of coaxial gear mechanisms having different transmission ratios, to a range of coaxial gear mechanisms having different transmission ratios and to a method for producing a coaxial gear mechanism.

PRIOR ART

The prior art discloses gear mechanisms which comprise tooth pins which are mounted so as to be axially displaceable in a tooth carrier. To drive the tooth pins, use is made of drive elements with a profiling. The tooth pins are moved in the axial direction and engage in a toothing such that there occurs a relative movement between the tooth carrier with the tooth pins and the toothing. Here, the relative movement between the toothing and tooth pins is smaller than the movement of the drive element with the profiling by at least one order of magnitude. In this way, high transmission ratios can be achieved. An example of such a gear mechanism is disclosed in DE 10 2019 129 660 A1.

However, in the case of previously known solutions from the prior art, there arise high costs or a high outlay in the production of gear mechanisms having different transmission ratios.

SUMMARY OF THE INVENTION

It is an object of the invention to specify a coaxial gear mechanism which is improved in relation to coaxial gear mechanisms known from the prior art, with it being intended in particular to achieve a simpler or more cost-effective provision of coaxial gear mechanisms having different transmission ratios. Furthermore, it is an object of the invention to specify a range of coaxial gear mechanisms having different transmission ratios and a method for producing a coaxial gear mechanism.

The object is achieved with a coaxial gear mechanism as disclosed herein and with a range and a method also as disclosed herein. Advantageous developments and embodiments will emerge from the dependent claims and from this description.

One aspect of the invention relates to a coaxial gear mechanism, comprising: A toothing which is oriented axially with respect to an axis of rotation of the coaxial gear mechanism, a tooth carrier which in each case has axially oriented guides, and tooth pins which each comprise a body, which is mounted so as to be axially displaceable in a guide of the tooth carrier, and a head region, wherein the head region comprises at least one tooth for engagement with the toothing, and wherein the tooth carrier has an irregular angular pitch.

A further aspect of the invention relates to a range of coaxial gear mechanisms having different transmission ratios, each according to one of the embodiments described herein.

Yet a further aspect of the invention relates to a method for producing a coaxial gear mechanism from a range comprising a plurality of coaxial gear mechanisms having different transmission ratios, wherein the coaxial gear mechanism comprises: a toothing which is oriented axially with respect to an axis of rotation of the coaxial gear mechanism, a tooth carrier which in each case has axially oriented guides, and tooth pins which each comprise a body, which is designed to be axially displaceably mounted in a guide of the tooth carrier, and a head region, wherein the head region comprises at least one tooth for engagement with the toothing. The method comprises: selecting the tooth carrier from a plurality of tooth carriers, wherein the tooth carriers each have different angular pitches of the guides for realizing the different transmission ratios, and mounting the coaxial gear mechanism with the toothing, the selected tooth carrier and the tooth pins.

Typically, the tooth carrier is selected from a plurality of tooth carriers, wherein the tooth carriers each have different angular pitches of the guides for realizing the different transmission ratios.

Expressions such as "axially", "radially", or "circumferential direction" are typically to be understood herein as meaning with respect to the axis of rotation of the coaxial gear mechanism, for example with respect to the axis of rotation of the cam disk of the coaxial gear mechanism.

In typical embodiments, the guides of the tooth carrier are oriented axially with respect to the axis of rotation of the coaxial gear mechanism. The tooth pins are typically mounted in an axially displaceable manner in the guides of the tooth carrier. A tooth pin is typically mounted displaceably in precisely one direction, typically in the direction of the longitudinal axis of the tooth pin, in a guide of the tooth carrier. This can be achieved, for example, by the tooth pin having a constant cross section in the displacement direction over a certain length, in particular over a certain length of the body along the longitudinal axis of the tooth pin. The tooth pin can be accommodated in the guide in such a manner that the tooth pin is mounted displaceably axially with respect to the axis of rotation of the coaxial gear mechanism along the longitudinal axis in the guide. A guide for a tooth pin in the tooth carrier is typically designed as a bore or opening with a cross section which is constant in the axial direction. The bore or opening is typically configured to be continuous in the axial direction through the tooth carrier. The guides are typically configured as round openings or bores, in particular as circular openings or bores. Further typical tooth carriers comprise rectangular milled portions or oblong holes or slots as guides. In typical embodiments, the tooth carrier engages around the axis of rotation in the circumferential direction. In particular, the tooth carrier can be configured to be circular or annular.

In typical embodiments, the tooth carrier is selected from a plurality of tooth carriers. The tooth carriers of the plurality of tooth carriers are typically each configured to realize one of the coaxial gear mechanisms of a range of coaxial gear mechanisms. The coaxial gear mechanisms of the range typically have different transmission ratios. In particular, the coaxial gear mechanisms of the range comprise identical toothing parts, for example identical toothings or identical tooth pins.

In typical embodiments, the coaxial gear mechanism is produced from a kit. The kit typically comprises a toothing, tooth pins and one or more tooth carriers. In particular, the kit can comprise a plurality of tooth carriers. For example, a coaxial gear mechanism having one of a plurality of different transmission ratios can be produced from the kit by selecting a tooth carrier. In embodiments, tooth carriers can each be produced from a prefabricated tooth carrier part, in particular from identical prefabricated tooth carrier parts. The prefabricated tooth carrier parts typically have no guides, in particular no guides configured as bores or openings. The guides can be produced, for example bored, in the prefabricated tooth carrier part to provide a tooth carrier, wherein the guides are arranged in the circumferential direction to realize a coaxial gear mechanism having a certain transmission ratio.

Adjacent guides of a tooth carrier are typically spaced apart from one another in the circumferential direction about the axis of rotation by a respective angle. An angle between adjacent guides is typically the angle which is defined between two radii from the axis of rotation to the respective center points of the adjacent guides. An angular pitch of a tooth carrier typically defines the arrangement of the guides of the tooth carrier in the circumferential direction, in particular the angles between adjacent guides and the distribution of the angles in the circumferential direction.

In typical embodiments, the coaxial gear mechanism comprises a cam disk which can be rotated about the axis of rotation to axially drive the tooth pins. The cam disk typically comprises a profiling as drive element for axially driving the tooth pins, in particular by means of an axial stroke of the tooth pins. The profiling is typically configured along the circumferential direction of the cam disk with at least one elevation in the axial direction, in particular with at least two or at least three elevations. The profiling of the cam disk typically follows a helical surface in portions or is designed to be curved in the circumferential direction. The cam disk, the tooth carrier and the toothing are typically arranged in this sequence in an axial direction. Driving of the cam disk with the profiling allows a force to be exerted on the tooth pins in the direction of the respective longitudinal axis of the tooth pins such that the tooth pins are pressed in the guides of the tooth carrier in the direction of the toothing.

In typical embodiments, the cam disk is selected from a plurality of cam disks having different numbers of axial elevations. In particular, the kit can comprise a plurality of cam disks having different numbers of axial elevations. In typical embodiments, cam disks can each be produced from a prefabricated cam disk part, in particular from identical prefabricated cam disk parts. At least one axial elevation can be worked, for example milled, out of a prefabricated cam disk part to provide a cam disk, wherein the number of axial elevations is determined in order to realize a coaxial gear mechanism having a certain transmission ratio.

Typical coaxial gear mechanisms comprise an axially oriented toothing. In particular, the toothing can be configured as a toothing of a crown gear. The toothing typically comprises toothing teeth which are arranged in a row in the circumferential direction. The toothing teeth each typically comprise two toothing flanks. In typical embodiments, the toothing for the coaxial gear mechanisms of the range having different transmission ratios is provided identically, in particular with an identical number of teeth of the toothing or an identical diameter of the toothing.

Typical coaxial gear mechanisms have a drive shaft and an output shaft. The drive shaft and the output shaft are typically mounted so as to be rotatable about the axis of rotation of the coaxial gear mechanism. The drive shaft or the output shaft or both are typically configured as hollow shafts. The cam disk is typically provided on the drive shaft. In typical embodiments, the tooth carrier is provided on the output shaft, wherein in particular the toothing or a crown gear with the toothing is connected to a housing of the coaxial gear mechanism for rotation therewith or is not rotatable relative to the housing. In further typical embodiments, a toothing or a crown gear with the toothing is provided on the output shaft, wherein in particular a tooth carrier is connected to a housing of the coaxial gear mechanism for rotation therewith or is not rotatable relative to the housing.

In typical embodiments, the tooth pins each comprise a body which is mounted so as to be axially displaceable in a guide of the tooth carrier. The body typically extends along the longitudinal axis of a tooth pin. The longitudinal axis of the tooth pin is typically oriented at least substantially parallel to the axis of rotation of the coaxial gear mechanism. The body is typically at least partially accommodated in a guide of the tooth carrier. The body can have an at least substantially constant cross section along the longitudinal axis of the tooth pin. In typical embodiments, a cross-sectional area of the body perpendicular to the longitudinal axis of the tooth pin is designed to be round. In particular, the cross-sectional area of the body can be designed to be circular. The body is typically designed to be at least substantially cylindrical. In further typical embodiments, the body has an at least partially nonround cross-sectional area, for example a polygonal cross-section area, in particular a square cross-sectional area, or a round cross-sectional area having at least one flattened portion, in particular a circular cross-sectional area having at least one flattened portion.

At least part of the tooth pins is typically of flexurally rigid design. The expression "flexurally rigid" is typically to be understood technically here to mean that, owing to the stiffness of the material of the tooth pins, bending movements of the tooth pins are so small that they are at least substantially insignificant for the kinematics of the coaxial gear mechanism.

In embodiments, the tooth pin comprises a tooth pin base in an end region of the tooth pin that faces the cam disk. The tooth pin base is typically configured for mounting the tooth pin on a bearing segment of the coaxial gear mechanism. In typical embodiments, the tooth pins each comprise a head region. The head region typically comprises at least one tooth, in particular at least two teeth, for engagement with the toothing. A tooth typically comprises two teeth flanks. The tooth typically comprises a tooth head. The tooth head typically forms the transition between the two teeth flanks of the tooth. The tooth head is typically rounded. The tooth head typically extends at least substantially in the radial direction. The head region typically comprises a base between the body of a tooth pin and the at least one tooth. The at least one tooth is typically arranged on the base, in particular on a side of the base that faces the toothing.

The head region is typically configured to be widened with respect to the body in the circumferential direction about the axis of rotation. The head region can in particular be configured to be widened with respect to the body in one circumferential direction or both circumferential directions. In embodiments, the head region is configured to be widened with respect to the body in the radial direction. The head region can be widened radially inward or radially outward with respect to the axis of rotation of the coaxial gear mechanism, in particular radially inward and radially outward. A widening of the head region can in particular offer the advantage that an engagement surface for the engagement of the at least one tooth of a tooth pin with the toothing is increased. In further typical embodiments, the head region has substantially the same width as the body in the radial direction.

In typical embodiments, teeth flanks of a tooth or toothing flanks of the toothing run at least partially along helical lines about the axis of rotation. In embodiments, a tooth flank or a toothing flank can run at least partially along a helical surface. In particular, a flat engagement of the tooth flanks and of the toothing flanks can be provided.

In typical embodiments, the head region comprises a single tooth, in particular a single tooth having precisely two teeth flanks.

In further typical embodiments, the tooth pins each comprise, in the head region, at least two teeth for engagement with the toothing, in particular at least three or at least four teeth. The head region typically comprises a maximum of 15 teeth, in particular a maximum of 10 teeth or a maximum of 8 teeth. The teeth are typically arranged in a row in the circumferential direction. Tooth pins having more than one tooth can offer the advantage that the tooth pins can be operated with a smaller tooth stroke for engagement of the teeth with the toothing.

A tooth pitch angle of the at least two teeth of the head region of a tooth pin is typically at least substantially identical or identical to a multiple of a toothing pitch angle of the toothing, in particular at least substantially identical to an integral multiple. The tooth pitch angle is determined, for example, from the angle which two teeth which are adjacent in the circumferential direction, in particular tooth heads of the adjacent teeth, of a head region enclose with respect to the axis of rotation. The toothing pitch angle of the toothing is calculated, for example, as 360 degrees divided by the number of teeth of the toothing.

In typical embodiments, the tooth pins each have the same number of teeth. In particular, the tooth pins can be uniformly formed. In particular, the tooth pins are designed as identical parts.

In further typical embodiments, the tooth pins comprise a group of uniform tooth pins and at least one special tooth pin which is different from the uniform tooth pins. The at least one special tooth pin typically has, in the head region, a special number of teeth which is different from a number of teeth of a tooth pin of the uniform tooth pins. For example, the special number can be less by at least or precisely one than the number of teeth of one of the uniform tooth pins. The number of uniform tooth pins is typically greater than the number of special tooth pins. In embodiments, the tooth pins comprise at least one special tooth pin, in particular at least two or at least three, or at most 10 special tooth pins, in particular at most 7 or at most 5. For example, the tooth pins can comprise precisely one special tooth pin.

In typical embodiments, the number of tooth pins for the coaxial gear mechanisms of the range is identical. Typically, the number of guides in the tooth carriers for the coaxial gear mechanisms of the range is identical. In embodiments, coaxial gear mechanisms having different transmission ratios can be produced with identical sets of tooth pins. In further embodiments, coaxial gear mechanisms having different transmission ratios can be produced with different sets of tooth pins. For example, a first coaxial gear mechanism of a range can be produced using a first set of first, uniform tooth pins, and a second coaxial gear mechanism of the range can be produced using a group of the first, uniform tooth pins and using at least one special tooth pin.

In typical embodiments, in particular in the case of at least one coaxial gear mechanism of a range according to embodiments, a calculated number of teeth of the coaxial gear mechanism differs by a whole number not equal to zero from the integral multiple of the number of guides closest to the number of teeth of the toothing. The number of axial elevations of the cam disk is typically determined by the calculated number of teeth and the number of teeth of the toothing. In particular, the number of axial elevations of the cam disk can be equal to the amount of the difference between the calculated number of teeth and the number of teeth of the toothing.

In typical embodiments, at least one of the plurality of tooth carriers, in particular the tooth carrier of the coaxial gear mechanism, has an irregular angular pitch. The irregular angular pitch typically comprises a group of identical first angles between adjacent guides and at least one second angle, which is different from the first angles, between adjacent guides, in particular between further adjacent guides. The angular pitch typically comprises at least one second angle, in particular at least two or at least three, or at most 12 second angles, in particular at most 10 or at most 8 second angles. In embodiments, the first angles are each equal to 360 degrees times the number of teeth per head region of the tooth pins divided by the calculated number of teeth. The sum of the first angles and of the at least one second angle is typically equal to 360 degrees.

In typical embodiments, the transmission ratio i results from the calculated number of teeth $Z_z$ and the number of teeth $Z_v$ of the toothing as follows:

$$i = 1 - \frac{(-Z_V)}{Z_Z + (-Z_V)}$$

Embodiments can have the advantage that coaxial gear mechanisms having different transmission ratios can be produced using identical toothing parts, for example using the same toothing or at least partially identical tooth pins. In particular, different transmission ratios can be achieved by varying the angular pitch in the tooth carrier or the calculated number of teeth.

In typical embodiments, the at least one second angle is greater than a first angle. A gap between adjacent tooth pins is typically formed in an angular range of a second angle in the circumferential direction. The calculated number of teeth is typically greater than the integral multiple of the number of guides closest to the number of teeth of the toothing. The at least one second angle is typically greater than a first angle by 360 degrees divided by the calculated number of teeth. In further typical embodiments, the second angle is greater than a first angle by an integral multiple of 360 degrees divided by the calculated number of teeth.

In further typical embodiments, the at least one second angle is less than a first angle. The calculated number of teeth is typically less than the integral multiple of the number of guides closest to the number of teeth of the toothing. The at least one second angle typically differs from a first angle by 360 degrees divided by the calculated number of teeth and divided by a natural number. For example, a guide in both circumferential directions can in each case be separated from an adjacent guide by a second angle. The two mutually adjoining, second angles can, for example, be less than a first angle by 360 degrees divided by 2 and divided by the calculated number of teeth. In particular, the coaxial gear mechanism can have a special tooth pin in the guide of the mutually adjoining second angles. The special tooth pin can have a lower special number of teeth in the head region, in particular lower by at least one, than a tooth pin of the group of the uniform tooth pins of the coaxial gear mechanism.

In typical embodiments, at least one of the plurality of tooth carriers has a regular angular pitch. In the case of a regular angular pitch, all the angles between adjacent guides are typically equal. In the case of typical ranges, a coaxial guide mechanism, in particular precisely one coaxial gear mechanism of the range, has a calculated number of teeth which is equal to the integral multiple of the number of guides closest to the number of teeth of the toothing.

Typical coaxial gear mechanisms according to embodiments comprise a tooth bearing for mounting the tooth pins on a cam disk of the coaxial gear mechanism. The tooth bearing typically comprises bearing segments for the pivotable mounting of a tooth pin base of a tooth pin. The bearing segments can also be referred to as pivot segments. In typical embodiments, the bearing segments are arranged annularly. The bearing segments are typically arranged adjacent to one another in the circumferential direction. In embodiments, the bearing segments comprise a group of uniform bearing segments and at least one special bearing segment for at least one special tooth pin. For example, the at least one special bearing segment can be configured to be narrower in the circumferential direction than one of the uniform bearing segments. In embodiments, the bearing segments are produced from metal. In further embodiments, the bearing segments can be produced from plastic.

Rolling bodies are typically arranged between the cam disk and the bearing segments. The rolling bodies are typically configured as cylindrical rollers. In typical embodiments, the rolling bodies are arranged with their longitudinal axis at least substantially perpendicular to the axis of rotation of the gear mechanism. In typical embodiments, the rolling bodies can be guided in a cage which is suitable for following the stroke of the cam disk in a permanently elastic manner. In further typical embodiments, the bearing segments are mounted slidingly on the cam disk.

The bearing segments typically form, once assembled, a circular ring. Typical bearing segments can be configured as circular ring portions, in trapezoidal form with straight outer or inner edges or both, or with a substantially round cross section, wherein the edges are flattened in the circumferential direction.

Typical embodiments comprise an antirotation securing ring which is arranged between the tooth pins and the bearing segments and which in particular prevents rotation of the tooth pins about their respective longitudinal axis, typically with respect to the antirotation securing ring. In typical embodiments, the antirotation securing ring is circular ring-shaped, running around the axis of rotation, and comprises openings for receiving the tooth pins. Typical antirotation securing rings of embodiments are elastic, for example made of plastic, in particular of POM, PA, PEI, PPS, PK or PEEK. This allows adaptation to the deformation during the revolution of the cam disk.

An angular pitch of the antirotation securing ring, in particular the angular pitch of the openings for receiving the tooth pins, is typically identical to the angular pitch of the tooth carrier. In typical embodiments, the antirotation securing ring is selected from a plurality of antirotation securing rings having different angular pitches, in particular for realizing one of the coaxial gear mechanisms of the range of coaxial gear mechanisms having different transmission ratios.

In typical embodiments, the antirotation securing ring comprises at least one web. The at least one web is typically formed on that side of the antirotation securing ring which faces the cam disk. The web typically projects axially in the direction of the cam disk. A longitudinal axis of the web typically extends in the radial direction. A web is typically arranged in an angular range of a second angle, in particular of a second angle which is larger than one of the first angles. The web can in particular be configured to fill a gap between two adjacent bearing segments. For example, the web can extend in the axial direction and substantially up to the axial height of a running surface of the bearing segments. Webs according to embodiments can offer the advantage that rolling bodies are prevented from falling out of the cage, in particular prevent a rolling body from falling out into a gap between the two bearing segments.

Typical tooth pins of embodiments have a cross-sectionally circular tooth body and a noncircular cross section in the region of the tooth pin base for engagement with a correspondingly shaped opening in the antirotation securing ring. Typical cross sections of embodiments of the tooth pin base comprise a lateral flattening for rotationally securing the entire tooth pin about its longitudinal axis by engagement in an opening of the antirotation securing ring. Typical embodiments provide a form fit in the region of the tooth pin base. An antirotation securing means can particularly ensure that the tooth pin, in the unloaded state, is not rotated with respect to the toothing. Reliable engagement in the toothing can be ensured in this way.

In typical embodiments, the antirotation securing ring prevents the bearing segments from rotating with respect to one another, in particular from rotating about an axis parallel to the axis of rotation of the gear mechanism or about a longitudinal axis of the tooth pins. Furthermore, the antirotation securing ring can serve as a mounting aid for the bearing segments. For this purpose, for mounting, the bearing segments are typically inserted into the antirotation securing ring and then pushed together onto the tooth pins already situated in the tooth carrier.

The antirotation securing ring typically comprises lugs in the direction of the cam disk for positionally securing the bearing segments. The lugs can also be referred to as reliefs. The lugs typically engage in corresponding edge shapes within or in the edge region of the bearing segments. Examples of edge shapes can be flattened corners or grooves in edges. The lugs can be arranged radially inward or radially outward with respect to the bearing segments.

In typical methods for producing a coaxial gear mechanism from a range comprising a plurality of coaxial gear mechanisms having different transmission ratios, coaxial gear mechanisms can in particular be produced according to embodiments described herein.

In typical embodiments, the method comprises providing prefabricated tooth carrier parts for a tooth carrier, in particular identical prefabricated tooth carrier parts. A prefabricated tooth carrier part typically has no guides for tooth pins. The method can comprise producing a plurality of tooth carriers from the prefabricated tooth carrier parts. The production of the plurality of tooth carriers typically comprises creating guides in the prefabricated tooth carrier parts, for example drilling the guides. The tooth carriers are typically produced with different angular pitches of the guides for realizing different transmission ratios.

In typical embodiments, the method comprises providing prefabricated cam disk parts for a cam disk, in particular identical prefabricated cam disk parts without a profiling with axial elevations. The method typically comprises producing a plurality of cam disks from the prefabricated cam disk parts, for example by milling the profiling and the axial elevations out of the prefabricated cam disk parts. The cam disks are typically produced with different numbers of axial elevations.

The method typically comprises selecting a tooth carrier from the plurality of tooth carriers. The method can comprise selecting a cam disk from the plurality of cam disks.

The tooth carrier or the cam disk is typically selected for realizing a coaxial gear mechanism having a certain transmission ratio.

Typical methods comprise providing a plurality of antirotation securing rings. The plurality of antirotation securing means typically have different angular pitches. In typical embodiments, the method can comprise selecting an antirotation securing ring from the plurality of antirotation securing rings. The angular pitch of the selected antirotation securing ring typically corresponds to the angular pitch of the selected tooth carrier.

The method typically comprises mounting the coaxial gear mechanism with a toothing, the selected tooth carrier and the tooth pins, in particular with the selected cam disk or the selected antirotation securing ring.

In relation to the prior art, typical embodiments of the coaxial gear mechanism can offer the advantage that coaxial gear mechanisms having different transmission ratios can be produced in a simpler, quicker or more cost-effective manner. In particular, coaxial gear mechanisms can be produced using a smaller number of transmission ratio-specific toothing parts. Different transmission ratios can be provided by varying production parameters when making bores for producing guides in the tooth carrier or when milling the cam disk. The outlay or the costs involved in designing, simulating or producing two toothing parts per transmission ratio can be reduced in embodiments.

BRIEF DESCRIPTION OF THE DRAWINGS

The invention will be explained in more detail below on the basis of the appended drawings. In the figures.

DETAILED DESCRIPTION

Typical embodiments of the invention will be described below on the basis of the figures, with the invention not being limited to the exemplary embodiments; rather, the scope of the invention is defined by the claims.

In the description of the embodiments, in some cases in different figures and for different embodiments, the same reference signs are used for identical or similar parts. For the sake of clarity, features which have already been described in conjunction with other figures will sometimes not be mentioned or described repeatedly. For clarity, sometimes not all the respective features are provided with a reference sign, for example the bearing segments or the tooth pins.

Figure 1:
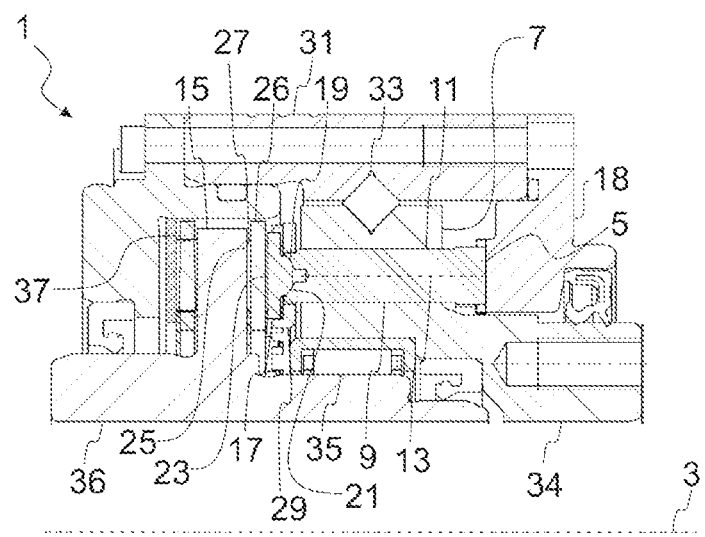
FIG. 1 shows a typical embodiment of the coaxial gear mechanism in a partially schematic sectional view.

FIG. 1 illustrates a detail of a typical embodiment of the invention in a schematic sectional view. FIG. 1 shows part of a coaxial gear mechanism 1 having a toothing 5 oriented with respect to an axis of rotation 3 of the coaxial gear mechanism 1. The toothing 5 is configured as a toothing of a crown gear 18 running around the axis of rotation 3. The crown gear 18 is connected to a housing 31 of the coaxial gear mechanism 1 for rotation therewith.

The coaxial gear mechanism 1 comprises a tooth carrier 7 which is provided on an output shaft 34. The output shaft 34 is mounted on the housing 31 so as to be rotatable about the axis of rotation 3 via a first bearing 33. The tooth carrier 7 has axially oriented guides 9 in which in each case tooth pins 11 are received. The tooth pins 11 are mounted along their respective longitudinal axes 13 in the guides 9 so as to be displaceable axially with respect to the axis of rotation 3.

The tooth pins 11 each comprise a head region, which is oriented to engage with the toothing 5, and a tooth pin base which projects out of the guide 9 of the respective tooth pin 11 and is mounted on a bearing segment 17. A tooth pin 11 further comprises a body between the tooth pin base and the tooth head, wherein the body is at least partially received in the guide 9 of the tooth pin 11.

The tooth pin base of the tooth pin 11 is mounted by a recess 21 on a partially spherical cap-shaped elevation 19 of the bearing segment 17. Between the tooth pins 11 and the bearing segments 17 there is arranged an antirotation securing ring 29 for securing the tooth pins 11 against rotation about the respective longitudinal axis 13. The bearing segments 17 are each mounted by a running surface 23 on their side facing away from the tooth pin on a rolling bearing having rolling bodies 27, which rolling bearing is in turn mounted on a profiling 25 of a cam disk 15 of the coaxial gear mechanism 1. What can be seen of the rolling bearing sectioned in FIG. 1 is substantially a web of a cage 26 for the rolling bodies 27 (these being partially concealed). The rolling bodies 27 are configured as needle rollers.

The cam disk 15 is provided on a drive shaft 36. The drive shaft 36 is mounted on the tooth carrier 7, and thus indirectly also on the housing 31, so as to be rotatable about the axis of rotation 3 via a second bearing 35. The cam disk 15 is mounted with respect to the housing 31 via an axial bearing 37 having needle rollers. The profiling 25 of the cam disk 15 is configured to run around the axis of rotation 3 and has, in FIG. 1, an axial elevation in the direction of the tooth pins 11.

Figure 2A:
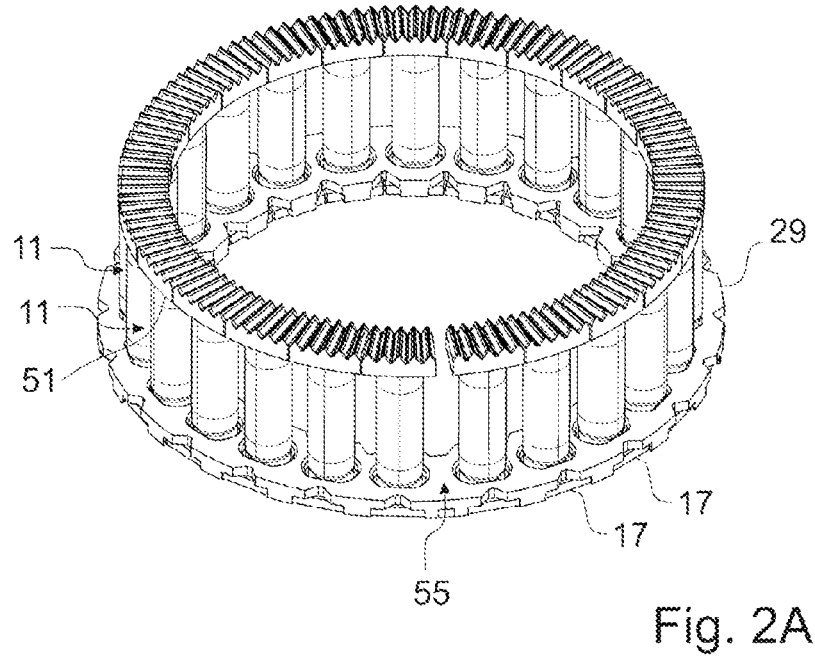
FIGS. 2A-2B show schematic views of bearing segments, tooth pins and of an antirotation securing ring according to one typical embodiment.
Figure 2B:
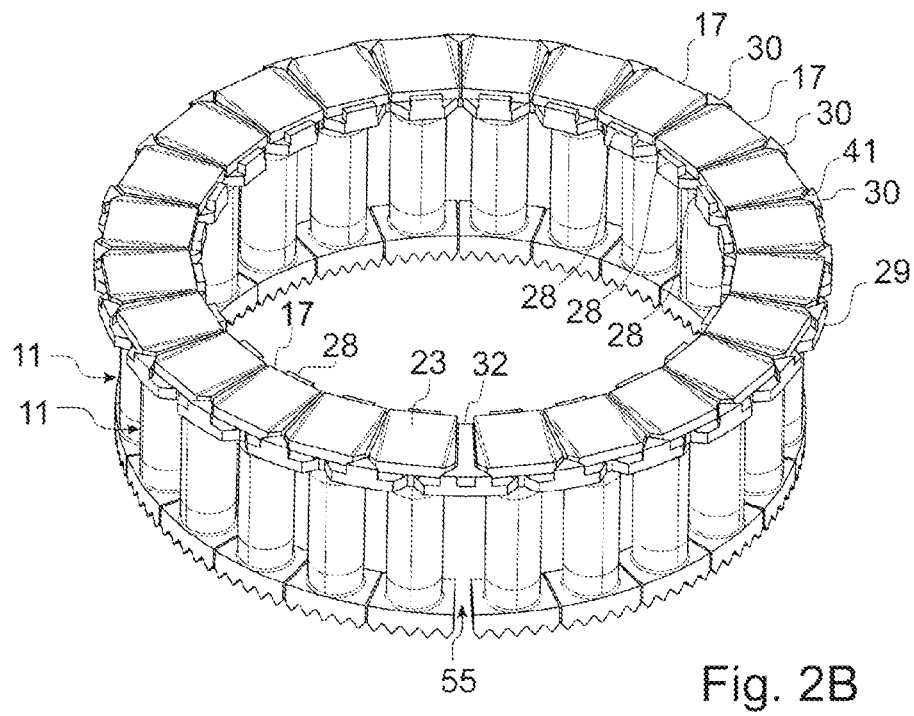

FIGS. 2A-2B schematically show the bearing segments 17, the antirotation securing ring 29 and the tooth pins 11 without tooth carrier and other components for better clarity. In the embodiment of FIGS. 2A-2B, the tooth carrier (not shown) comprises 24 guides for 24 tooth pins 11. The embodiment has a number of teeth $Z_v=120$ of the toothing, a calculated number of teeth $Z_z=121$, a number $p=1$ of axial elevations of the cam disk and a transmission ratio $i=121$. The tooth pins 11 are uniformly formed. The tooth pins 11 each comprise a head region having five teeth. The angular pitch of the tooth carrier and of the antirotation securing ring 29 comprises a group of uniform first angles of in each case, rounded, 14.876 degrees (=360 degrees*5/121) and precisely one second angle of, rounded, 17.851 degrees, which corresponds to the sum of a first angle and 360 degrees/121. In particular, the second angle is larger than one of the first angles. In the angular range of the second angle, a gap 55 is formed between the tooth pins 11.

A range according to embodiments, comprising a coaxial gear mechanism having the toothing parts of FIGS. 2A-2B, comprises, for example, a further coaxial gear mechanism having a toothing with a number of teeth $Z_v=120$ that is identical to the embodiment of FIGS. 2A-2B. The further coaxial gear mechanism has a calculated number of teeth $Z_z=122$, a number $p=2$ of axial elevations of the cam disk and a transmission ratio $i=61$. The angular pitch comprises first angles of 14.754 degrees and two second angles. The two second angles are arranged spaced apart in the circumferential direction such that two gaps are formed between the tooth pins. The range comprises, for example, yet a further coaxial gear mechanism having a number of teeth of the toothing $Z_v=120$, a calculated number of teeth $Z_z=123$, a number p=3 of axial elevations of the cam disk and a transmission ratio i=41. The angular pitch comprises first angles of 14.634 degrees and three second angles which are spaced apart in the circumferential direction such that three gaps are formed between the tooth pins in the circumferential direction.

FIG. 2B shows a further schematic view of the embodiment illustrated in FIG. 2A, in particular with a view of the running surfaces 23 of the bearing segments 17. The bearing segments 17 are uniformly formed. The bearing segments 17 are nondisplaceable relative to the antirotation securing ring 29, being prevented from rotating by means of inner lugs 28 and outer lugs 30 of the antirotation securing ring 29. In each case one of the inner lugs 28 supports a respective inner edge of a bearing segment 17 against radially inward displacement. The radially outer corners 41 of the bearing segments 17 are each flattened in order to be in engagement with the cross-sectionally triangular outer lugs 30, with the result that a radially outward movement and a rotation are prevented in each case. Here, one of the outer lugs 30 in each case engages with two bearing segments 17.

In the region of the gap 55 between two tooth pins 11, the antirotation securing ring 29 comprises a web 32 on the side of the antirotation securing means 29 that faces the cam disk. The web 32 extends in the axial direction substantially up to the axial height of the running surface 23 of the bearing segments 17 adjacent to the web. The web 32 prevents rolling bodies from falling out of the cage into the gap between the bearing segments 17. Further embodiments of antirotation securing rings having inner lugs 28, outer lugs 30 or webs 32 are shown, for example, in FIGS. 3C and 5A-5B.

Figure 3A:
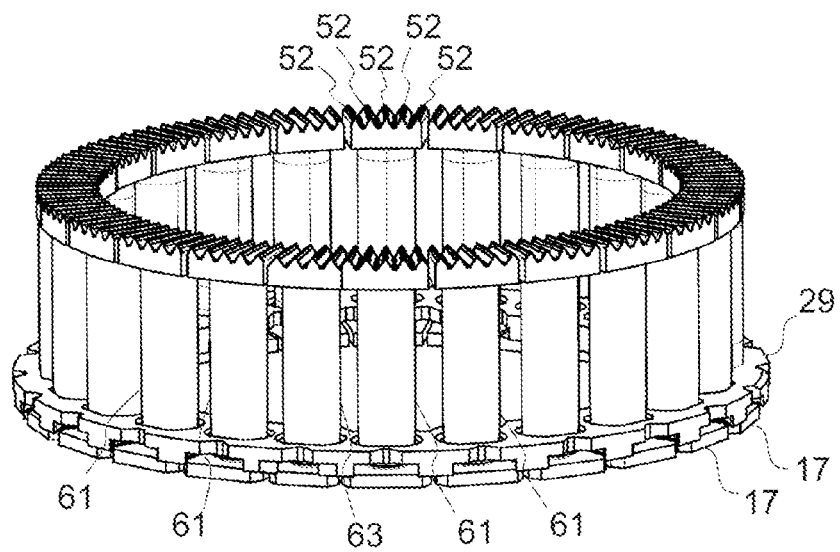
FIGS. 3A-3C show schematic views of bearing segments, tooth pins and of an antirotation securing ring according to a further typical embodiment.
Figure 3B:
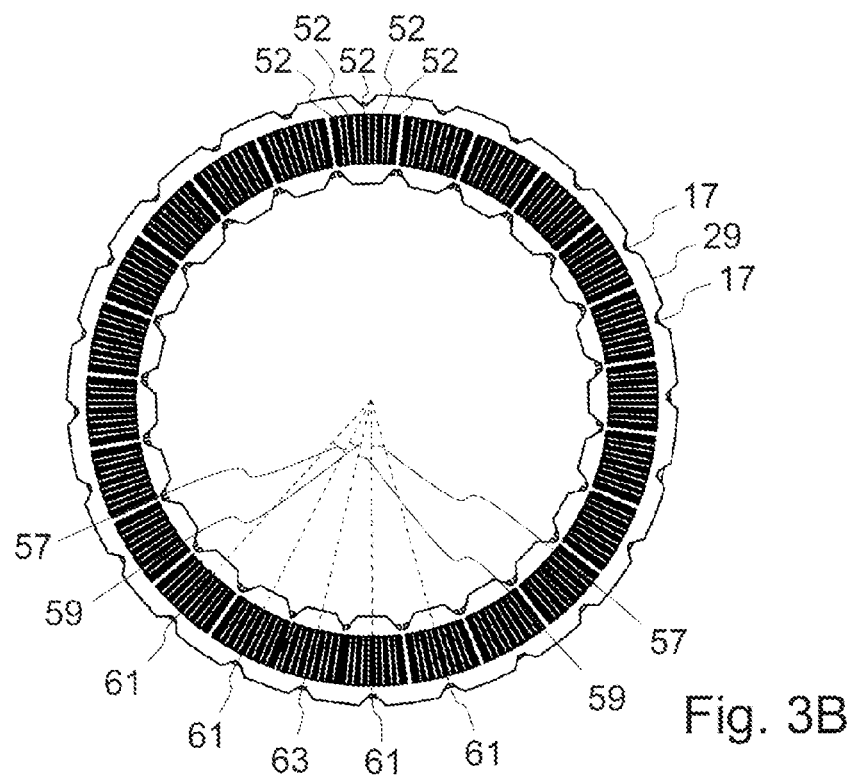
Figure 3C:
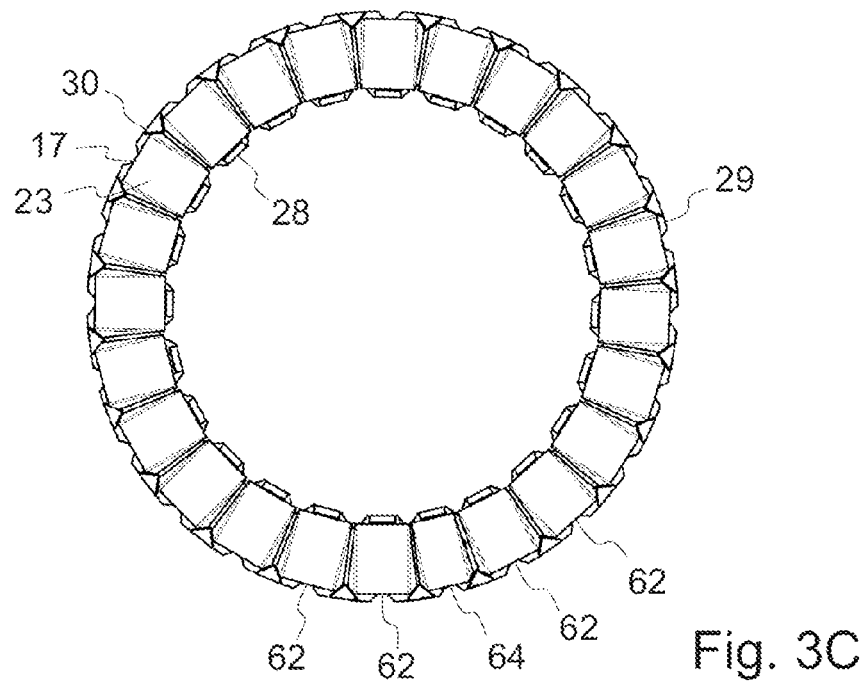

FIGS. 3A-3C show schematic views of bearing segments 17, an antirotation securing ring 29 and tooth pins 11 of a further embodiment, wherein the tooth carrier and other components of the coaxial gear mechanism are not shown for better clarity. The coaxial gear mechanism has a number of teeth $Z_v=118$ of the toothing, a calculated number of teeth $Z_z=119$, a number p=1 of axial elevations of the cam disk and a transmission ratio i=119. The tooth pins comprise a group of uniform tooth pins 61 each having five teeth 52 and a special tooth pin 63 having four teeth. As shown in the view of FIG. 3B of the teeth 52 of the tooth pins, the angular pitch of the tooth carrier and of the antirotation securing means 29 comprises a group of identical first angles 57, of which only two are depicted for the sake of clarity, and two second angles 59 arranged around the guide of the special tooth pin 63. The second angles 59 are each less than one of the first angles 57. FIG. 3C shows a view of the running surfaces 23 of the bearing segments 17. The bearing segments 17 comprise a group of uniform bearing segments 62 and a special bearing segment 64 assigned to the special tooth pin 63. The special bearing segment 64 is designed to be narrower in the circumferential direction than one of the uniform bearing segments 62.

Figure 4:
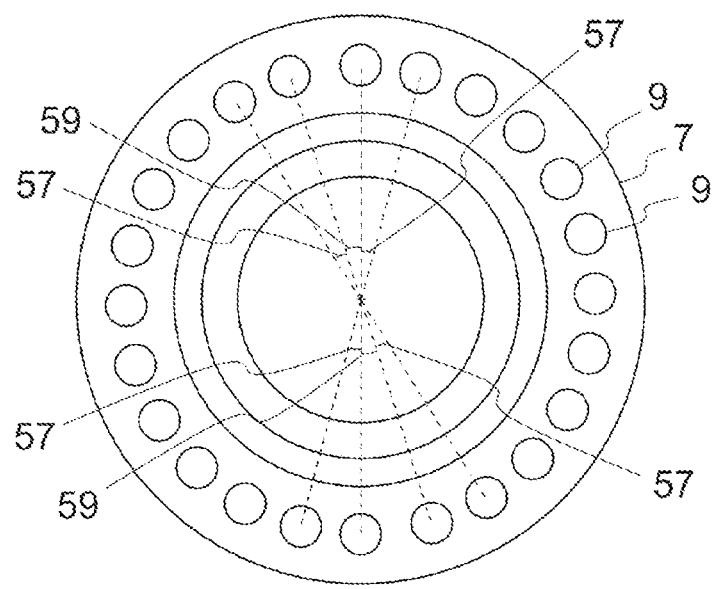
FIG. 4 shows a schematic view of a tooth carrier according to a further embodiment.

FIG. 4 shows a tooth carrier 7 for a coaxial gear mechanism according to a further embodiment, in particular from a further range having an identical toothing to that of the coaxial gear mechanism of FIG. 3A-3C. The angular pitch of the guides 9 of the tooth carrier 7 comprises identical, first angles 57 and two second angles 59 which are different from one of the first angles 57, wherein the second angles 59 are each larger than a first angle 57. For the sake of clarity, not all the first angles 57 are indicated in FIG. 3B. The second angles 59 are situated opposite one another in the circumferential direction such that two gaps occur in the circumferential direction between tooth pins inserted into the tooth carrier 7. In particular, uniformly formed tooth pins can be received in the tooth carrier 7. The tooth carrier 7 is designed for a coaxial gear mechanism having a number of teeth $Z_v=118$ of the toothing, a calculated number of teeth $Z_z=122$, a number p=4 of axial elevations of the cam disk and a transmission ratio i=30.5.

The further range comprises, for example, a further coaxial gear mechanism having a number of teeth $Z_v=118$ of the toothing, a calculated number of teeth $Z_z=121$, a number p=3 of axial elevations of the cam disk and a transmission ratio i=40.333. A gap is formed between the tooth pins in the circumferential direction. The further range comprises, for example, yet a further coaxial gear mechanism having a number of teeth of the toothing $Z_v=118$, a calculated number of teeth $Z_z=120$, a number p=2 of axial elevations of the cam disk and a transmission ratio i=60. The tooth carrier comprises 24 guides configured as bores. The angular pitch of the guides is regular and comprises only identical, first angles. The tooth pins are uniformly formed. Coaxial gear mechanisms according to embodiments have the advantage in particular that coaxial gear mechanisms of a range having different transmission ratios can be produced using the same toothing and identical tooth pins.

Figure 5A:
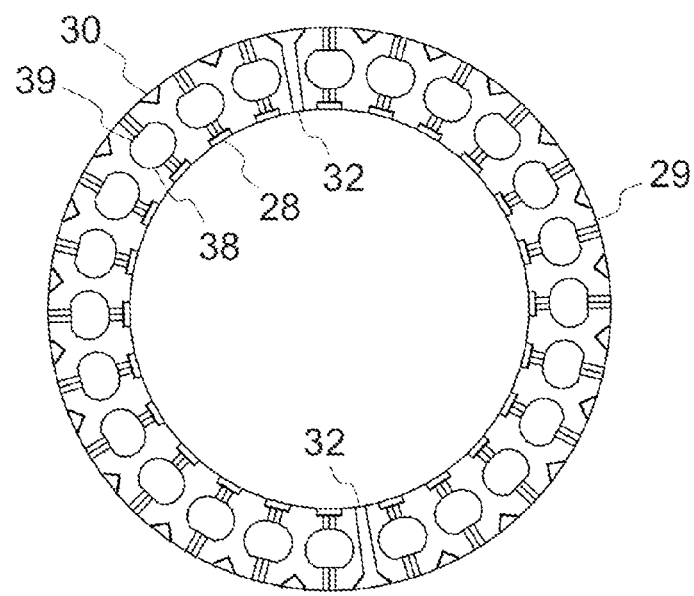
FIGS. 5A-5B show schematic views of an antirotation securing ring having an angular pitch corresponding to the tooth carrier of FIG. 4.
Figure 5B:
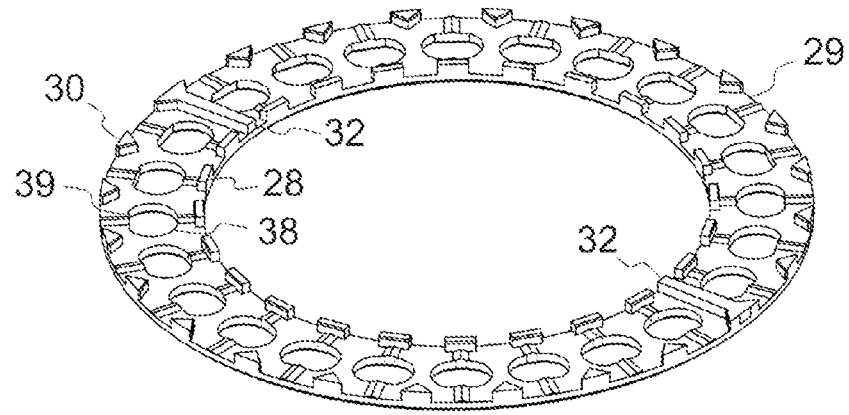

FIGS. 5A-5B show schematic views of an antirotation securing ring 29, in particular views of the side of the antirotation securing ring 29 that faces the cam disk. The antirotation securing ring 29 has inner lugs 28, outer lugs 30 and webs 32 according to embodiments described herein. In addition, the antirotation securing ring 29 has a respective opening 38 for each of the tooth pins 11. On their radial outer side, the openings 38 have a formation 39 which is straight in certain portions and which projects into the otherwise circular ring-shaped cross section of the opening 38. Each of the formations 39 interacts with a respective flattened portion of a tooth pin (see FIG. 6). In embodiments, a noncircular cross section of the tooth pin in the region of the tooth pin base allows an engagement to occur with the correspondingly shaped opening with formation in the antirotation securing ring such that the tooth pin is rotationally secured about its longitudinal axis.

Figure 6:
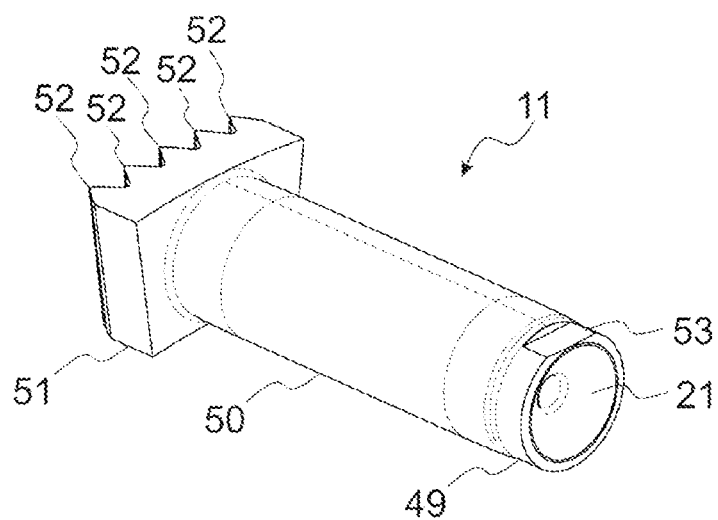
FIG. 6 shows a schematic view of a tooth pin according to typical embodiments.

FIG. 6 schematically shows a tooth pin 11 in an inclined view. The tooth pin 11 comprises a head region 51, a tooth pin base 49 and a body 50 which is arranged between the head region 51 and the tooth pin base 49. The tooth pin 11 has the concave recess 21 on the tooth pin base and a widened head region 51 with a plurality of teeth 52. With the widened head region 51, a plurality of teeth 52 are brought into engagement with the toothing 5 of the crown gear 18 such that a high torque can be transmitted via the teeth. FIG. 6 also shows the flattened portion 53 in the region of the tooth pin base 49 by means of which rotation of the tooth pin 11 is prevented by engagement with the formation in a respective opening of the antirotation securing ring.

The invention claimed is:
1. A coaxial gear mechanism (1), comprising:
a toothing (5) which is oriented axially with respect to an axis of rotation (3) of the coaxial gear mechanism (1),
a tooth carrier (7) which has axially oriented guides (9), and
tooth pins (11) which each comprise a body (50), which is mounted so as to be axially displaceable in a guide

(9) of the axially oriented guides (9) of the tooth carrier (7), and a head region (51), wherein the head region (51) comprises at least one tooth (52) for engagement with the toothing (5), wherein the tooth carrier has an irregular angular pitch, wherein the irregular angular pitch comprises a group of identical first angles (57) between adjacent guides (9) and at least one second angle (59), which is different from the first angles (57), between adjacent guides (9).

2. The coaxial gear mechanism (1) according to claim 1, wherein the tooth pins (11) each comprise at least two teeth (52) in the head region (51).

3. The coaxial gear mechanism (1) according to claim 1, wherein the tooth pins (11) are uniformly formed.

4. The coaxial gear mechanism (1) according to claim 1, wherein the tooth pins (11) comprise a group of uniform tooth pins (61) and at least one special tooth pin (63) which is different from the uniform tooth pins (61).

5. The coaxial gear mechanism (1) according to claim 4, wherein the at least one special tooth pin (63) has, in the head region (51), a special number of teeth (52) which is different from a number of teeth (52) of a tooth pin of the uniform tooth pins (61).

6. The coaxial gear mechanism (1) according to claim 4, further comprising a tooth bearing for mounting the tooth pins (11) on a cam disk (15) of the coaxial gear mechanism (1), wherein the tooth bearing comprises bearing segments (17) for pivotably mounting a tooth pin base of a tooth pin (11) of the tooth pins (11), wherein the bearing segments (17) comprise a group of uniform bearing segments (62) and at least one special bearing segment (64) for the at least one special tooth pin (63).

7. The coaxial gear mechanism (1) according to claim 1, wherein the coaxial gear mechanism (1) is produced from a kit for a range of coaxial gear mechanisms having different transmission ratios, and wherein the tooth carrier (7) is selected from a plurality of tooth carriers, wherein the tooth carriers (7) each have different angular pitches of the guides (9) for realizing the different transmission ratios.

8. The coaxial gear mechanism (1) according to claim 7, further comprising an antirotation securing ring (29) for rotationally securing the tooth pins (11), wherein an angular pitch of the antirotation securing ring (29) is equal to the angular pitch of the tooth carrier (7), and wherein the antirotation securing ring (29) is selected from a plurality of antirotation securing rings having different angular pitches.

9. The coaxial gear mechanism (1) according to claim 7, further comprising a cam disk (15) which in the circumferential direction has at least one axial elevation for axially driving the tooth pins (11), wherein the cam disk (15) is selected from a plurality of cam disks having different numbers of axial elevations.

10. The coaxial gear mechanism (1) according to claim 7, wherein the toothing (5) for the coaxial gear mechanisms of the range having different transmission ratios is provided identically.

11. A method for producing a coaxial gear mechanism (1) from a range comprising a plurality of coaxial gear mechanisms having different transmission ratios, wherein the coaxial gear mechanism (1) comprises:

a toothing (5) which is oriented axially with respect to an axis of rotation (3) of the coaxial gear mechanism (1), a tooth carrier (7) which has axially oriented guides (9), and tooth pins (11) which each comprise a body (50), which is axially displaceably mounted in a guide (9) of the axially oriented guides (9) of the tooth carrier (7), and a head region (51), wherein the head region (51) comprises at least one tooth (52) for engagement with the toothing (5), wherein the method comprises:

selecting the tooth carrier (7) from a plurality of tooth carriers, wherein the tooth carriers each have different angular pitches of the axially oriented guides (9) for realizing the different transmission ratios, and mounting the coaxial gear mechanism (1) with the toothing (5), the tooth carrier (7) and the tooth pins (11).

\* \* \* \* \*